April 28, 1953 E. A. LECHER 2,636,933
CONTROL SYSTEM RESPONSIVE TO PRESENCE OF MAGNETIC MATERIALS
Filed Nov. 21, 1949
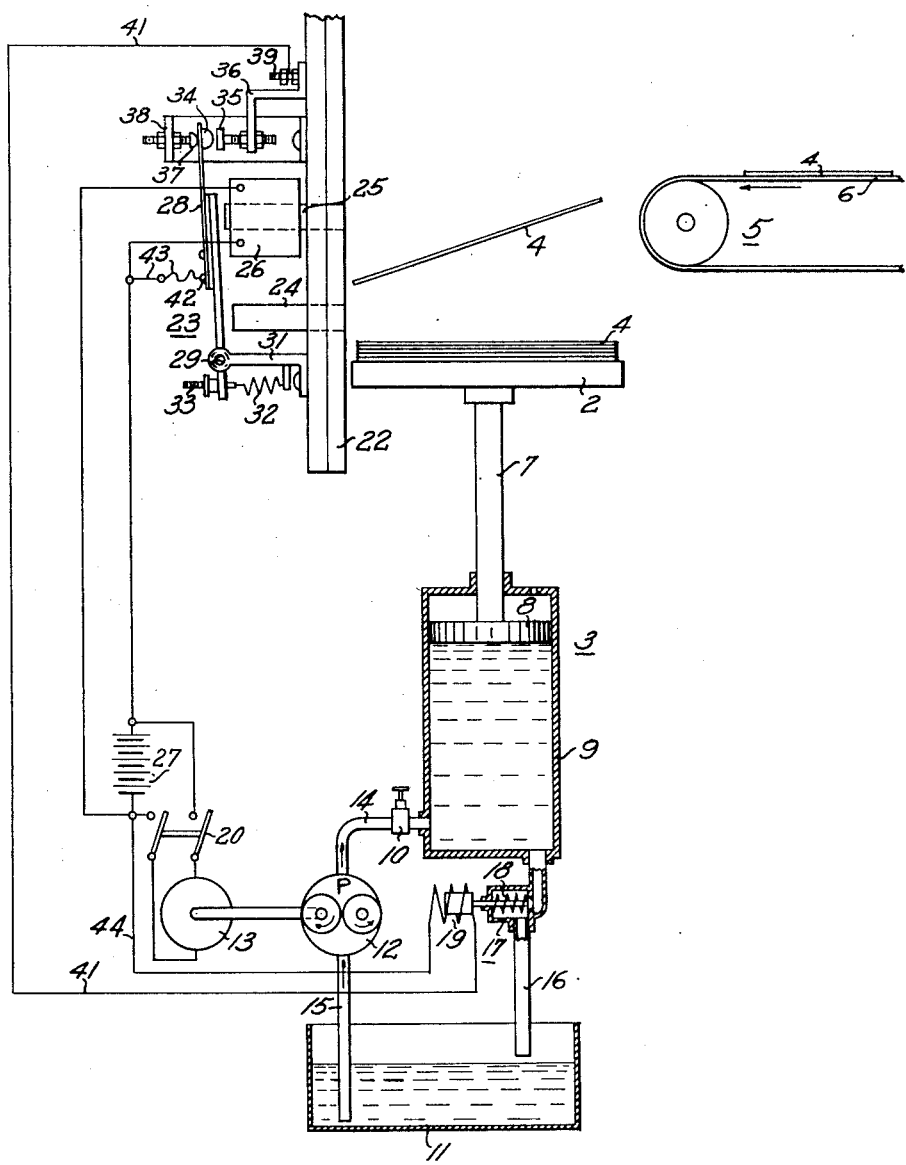
Inventor
Emil A. Lecher
by Didier Journeaux
Attorney Patented Apr. 28, 1953

2,636,933

UNITED STATES PATENT OFFICE 2,636,933

CONTROL SYSTEM RESPONSIVE TO PRESENCE OF MAGNETIC MATERIALS

Emil A. Lecher, Milwaukee, Wis., assignor to Allis-Chalmers Manufacturing Company, Milwaukee, Wis., a corporation of Delaware Application November 21, 1949, Serial No. 128,617

2 Claims. (Cl. 175—336)

This invention relates in general to systems responsive to the position of magnetic objects and in particular to systems for controlling the movement of a platform on which magnetic objects are adapted to be stacked.

At the delivery end of conveyers, where conveyed objects are removed from the conveyer and placed on a hoist or movable platform, it is desirable to control the position of the platform relative to the conveyer as the objects accumulate on the platform so as to maintain the uppermost object on the platform within a predetermined distance of the conveyer at all times. If the uppermost object is too far from the conveyer, the objects have too great a distance to fall and therefore arrange themselves irregularly on the platform, while if the uppermost object is too near the conveyer there is danger of the objects jamming the conveyer. Heretofore, the position of the platform as the objects accumulated thereon has been manually adjusted by an operator, with the consequent possibility of error or accident by the operator.

If the objects delivered by the conveyer are of a magnetic character, these disadvantages can be overcome by utilizing a control system responsive to the height of the magnetic objects on the platform for automatically adjusting the position of the platform relative to the conveyer as the objects accumulate on the platform.

It is therefore a purpose of this invention to provide a system for controlling the position of a platform on which magnetic objects are stacked in dependence upon the height of the stack of the magnetic objects.

It is a further purpose of the invention to provide a system for controlling the position of a platform to which magnetic objects are delivered from a conveyer which will maintain the distance between the conveyer and the uppermost object on the platform within predetermined limits.

Purposes and advantages other than those set forth above will be readily apparent from the following detailed description when read in connection with the accompanying drawing.

Referring to the drawing, one embodiment of the invention is shown as applied to the control of the position of the platform 2 of a hoist 3 to which magnetic objects 4, such as sheets of tin plate, are delivered by a conveyer 5. Conveyer 5 may be of any suitable type and is shown here as a belt type, with the belt 6 conveying an object 4 and moving in the arrow direction. Hoist 3 may be of any suitable type and is here shown as the hydraulic type, comprising a shaft 7 joining platform 2 to a piston 8 movable within a cylinder 9. Any suitable fluid under pressure such as oil is supplied to cylinder 9 from a reservoir 11 by a pump 12. Pump 12 may be driven by a motor 13 and is connected to cylinder 9 by a conduit 14 through a valve 10, and to reservoir 11 by a conduit 15. Motor 13 is energized from any suitable source such as a battery 27 through a switch 20.

Also connected to cylinder 9 is a conduit 16 which drains fluid from cylinder 9 to reservoir 11 through a solenoid valve 17 in conduit 16. Valve 17 is maintained normally closed by a spring 18, but may be opened by energization of its actuating coil 19.

Mounted adjacent the path of travel of platform 2 in any suitable nonmagnetic base 22 is a relay 23. Relay 23 is provided with an open core comprising magnetic legs 24 and 25 extending through base 22 and projecting from the base. The core may be magnetized either by providing leg 25 with coil 26 energized from a suitable source such as battery 27, or by making core leg 25 of permanently magnetized material. Relay 23 is also provided with a movable armature 28 pivoted at 29 on a knife edge carried by a bar 31 extending from base 22. A spring 32 attached to the lower end of armature 28 and to base 22 biases armature 28 against the attraction of winding 26, and a screw 33 provides means for adjusting the amount of this bias by varying the spring tension.

Armature 28 is provided with a contact 34 which is adapted to engage a stationary contact 35 carried by a conductive bracket 36 extending from base 22 when armature 28 is attracted by coil 26. An adjustable stop 37 mounted on an insulating bracket 38 secured to base 22 is provided to vary the air gap between armature 28 in its unattracted position and core legs 24 and 25. Bracket 36 is provided with a terminal stud 39 to which a conductor 41 is connected. A terminal stud 42 carried by armature 28 is connected to a flexible conductor 43 which is in turn connected to one terminal of source 27. Engagement of contacts 34 and 35 completes a circuit for energizing the coil 19 of valve 17 which may be traced as follows: from one terminal of source 27 through conductor 43, stud 42, through armature 28, engaged contacts 34 and 35, bracket 36, terminal stud 39, conductor 41, coil 19, and back to the other terminal of battery 27 through a conductor 44.

In operation of the system, assuming platform 2 to be empty and at its lower limit of travel, valve 10 is opened and motor 13 is energized from source 27 through switch 20 to drive pump 12.

The pump supplies fluid under pressure from reservoir 11 to cylinder 9 to elevate piston 8 and platform 2 to a predetermined height below conveyer 5 and below leg 24 of relay 23. Pump 12 is then stopped and valve 10 is closed. Platform 2 then remains at this predetermined height since coil 19 of valve 17 is deenergized and spring 18 maintains the valve closed. Coil 26 of relay 23 is energized from source 27 and circulates flux through a path comprising core leg 24, the air gap between leg 24 and armature 28, armature 28, the air gap between armature 28 and core leg 25, core leg 25, and the space adjacent legs 25 and 24 above platform 2.

In the absence of magnetic material in this space, the reluctance of the flux path is high and the flux density is insufficient to attract armature 28 to core legs 24 and 25 against the restraining force of spring 32. Armature 28 is therefore retained against stop 31 and contacts 34 and 35 are not engaged. The conveyer 5 may then be started, to deliver the magnetic objects 4 which drop to platform 2 upon reaching the end of the conveyer. The objects accumulate on platform 2 and as the stack of objects builds up, the objects on the platform gradually fill the flux path of relay 23 adjacent core legs 24 and 25 and lower the reluctance of the path.

When the objects have been stacked to a predetermined height on platform 2, the reluctance of the flux path is lowered by the magnetic objects to a predetermined extent sufficient to cause armature 28 to be actuated against the restraining force of spring 32. Actuation of armature 28 closes contacts 34 and 35 and thereby energizes coil 19 of valve 17 through the circuit described above. Energization of coil 19 opens valve 17 against the action of spring 18, permitting fluid to drain from cylinder 9 to reservoir 11. This fluid drain lowers the fluid pressure in cylinder 9 and causes piston 8 and platform 2 to descend. Descent of platform 2 a predetermined amount removes some of the objects stacked thereon from the flux path of relay 23 and increases the reluctance of the path to an extent sufficient to cause spring 32 to move armature 28 and open contacts 34 and 35.

Opening of contacts 34 and 35 breaks the energizing circuit for coil 19 of valve 17, permitting spring 18 to close the valve. Closure of valve 17 stops the drain of fluid from cylinder 9 and arrests the descent of platform 2 at a point at which the uppermost object on the platform is at the predetermined distance from conveyer 5. The objects continue to be deposited on platform 2 by conveyer 5 and the operation described above continues until platform 2 reaches its lower limit of travel. The point at which the magnetic objects lower the reluctance of the flux path sufficiently to cause armature 28 to be actuated may be readily varied by adjusting the tension in spring 32 through screw 33, or by adjusting the position of stop 31.

It will be seen that the position of platform 2 is automatically varied to maintain the distance between the conveyer 5 and the uppermost objects on the platform within predetermined limits at all times.

Although but one embodiment of the present invention has been illustrated in connection with the control of a platform on which magnetic objects are deposited from a conveyer, it will be apparent to those skilled in the art that various changes may be made therein without departing from the spirit of the invention or from the scope of the appended claims. In particular, it will be apparent that by mounting relay 23 horizontally the invention could be applied to the control of a platform on which magnetic objects are deposited adjacent one another rather than vertically as shown.

It is claimed and desired to secure by Letters Patent:

1. A relay comprising a core having a pair of substantially parallel spaced legs of magnetic material, exciting means mounted on one of said legs between the ends thereof, an armature attractable toward adjacent ends of said legs by the magnetic field produced by said exciting means, a nonmagnetic member separating said armature from the other adjacent ends of said legs, said other ends of said legs penetrating through said nonmagnetic member and cooperating therewith to define a smooth surface for guiding an object of magnetic material, pivot means secured to said nonmagnetic member for pivotally supporting said armature, and spring means for retaining said armature in a predetermined position against the attraction of said magnetic field when the magnetic reluctance of the space between said other adjacent leg ends is above a predetermined minimum value, whereby said armature is attracted toward the first said adjacent leg ends when the magnetic reluctance of said space between said other adjacent leg ends reaches said predetermined minimum value.

2. A relay comprising a core having a pair of substantially parallel spaced legs of magnetic material, an energized exciting coil mounted on one of said legs between the ends thereof, an armature attractable toward adjacent ends of said legs by the magnetic field produced by said coil, a nonmagnetic member separating said armature and said exciting coil from the other adjacent ends of said legs, said other ends of said legs penetrating through said nonmagnetic member and cooperating therewith to define a smooth surface for guiding an object of magnetic material, pivot means secured to said nonmagnetic member for pivotally supporting said armature, and spring means for retaining said armature in a predetermined position against the attraction of said magnetic field when the magnetic reluctance of the space between the other adjacent ends of said legs is above a predetermined minimum value, whereby said armature is attracted toward the first said adjacent leg ends when the magnetic reluctance of said space between said other adjacent leg ends reaches said predetermined minimum value.

EMIL A. LECHER.

References Cited in the file of this patent

UNITED STATES PATENTS

| Number | Name | Date |
| --- | --- | --- |
| 970,951 | Reabold | Sept. 20, 1910 |
| 1,639,851 | Kuntson | June 29, 1943 |
| 1,800,126 | Williams | Apr. 7, 1931 |
| 1,870,840 | Eames | Aug. 9, 1932 |
| 2,044,152 | Clancy | June 16, 1936 |
| 2,234,982 | Ross | Mar. 18, 1941 |
| 2,245,834 | Sparrow | Mar. 11, 1939 |
| 2,322,851 | Kalb | June 29, 1943 |
| 2,406,489 | Case | Aug. 27, 1946 |

FOREIGN PATENTS

| Number | Country | Date |
| --- | --- | --- |
| 457,540 | Great Britain | May 31, 1935 |